United States Patent
Ito et al.

(10) Patent No.: US 6,868,329 B2
(45) Date of Patent: Mar. 15, 2005

(54) CONTROL METHOD OF EGR SYSTEM OF ENGINE

(75) Inventors: Takumi Ito, Oyama (JP); Yasuyuki Onodera, Oyama (JP); Kanji Namimatsu, Oyama (JP); Shuki Akushichi, Sagamihara (JP); Koichi Okaya, Oyama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 10/686,351

(22) Filed: Oct. 14, 2003

(65) Prior Publication Data

US 2004/0084031 A1 May 6, 2004

(30) Foreign Application Priority Data

Oct. 30, 2002 (JP) .......................................... 2002-316147

(51) Int. Cl.$^7$ ................................................. B60T 7/12
(52) U.S. Cl. .................. 701/108; 701/106; 123/406.48; 123/568.16; 123/568.11; 123/568.22; 123/568.24; 123/568.25; 60/278; 60/600; 60/605.2
(58) Field of Search ................................. 701/106, 108; 123/406.48, 568.11, 568.12, 568.16, 568.19, 568.2, 568.22–568.25; 60/278, 600, 605.2

(56) References Cited

U.S. PATENT DOCUMENTS 5,918,582 A * 7/1999 Itoyama et al. ......... 123/568.29
6,199,537 B1 * 3/2001 Kowatari et al. ............ 123/399
6,230,697 B1 * 5/2001 Itoyama et al. ........ 123/568.21
6,425,371 B2 * 7/2002 Majima ................. 123/406.24
6,502,563 B2 * 1/2003 Itoyama ................. 123/568.21

FOREIGN PATENT DOCUMENTS

JP            9-53519 A        2/1997

* cited by examiner

Primary Examiner—Henry C. Yuen
Assistant Examiner—Johnny H. Hoang
(74) Attorney, Agent, or Firm—Frishauf, Holtz, Goodman & Chick, P.C.

(57) ABSTRACT

A control method of an EGR system of an engine capable of effectively performing an EGR control at a time of rapid acceleration. For this purpose, an intake air flow rate of the engine is obtained, and from a target EGR valve opening degree and a difference in pressure in front of and behind the EGR valve, a virtual EGR gas flow rate is arithmetically operated. A virtual EGR rate is obtained from the intake air flow rate, the fuel flow rate and the virtual EGR gas flow rate, and a difference from or a ratio to a target EGR rate obtained from the engine speed and the fuel flow rate is obtained. A command EGR valve opening degree is obtained from an EGR valve opening degree correction coefficient obtained from the difference or the ratio, and the target EGR valve opening degree, whereby the EGR vale is driven.

2 Claims, 8 Drawing Sheets

CONTROL METHOD OF EGR SYSTEM OF ENGINE

TECHNICAL FIELD

The present invention relates to a method for controlling an EGR rate in accordance with an operational state of an engine in an EGR system of the engine.

BACKGROUND ART

Conventionally, in an EGR control of an EGR system of an engine, there is the one that sets a target EGR rate for each operational state constituted of, for example, an engine speed, an engine load such as a fuel injection rate and an acceleration opening degree, and conducts a control of an opening degree of an EGR control valve to attain the target EGR rate. However, such a control cannot cope with a change in air density during an operation on, for example, a highland, and therefore smoke and exhaust fine particles (PM) are increased due to a too large amount of EGR, or a sufficient NOx reduction effect cannot be obtained due to a too small amount of EGR in some cases. If EGR is carried out when the fuel injection rate is rapidly increased at the time of rapid acceleration or the like, an excess air ratio is sharply reduced, and there arises the problem of smoke and PM being increased. Due to this, EGR is conventionally reduced at the time of rapid acceleration or the like. However, with this method, EGR is reduced more than necessary, or the EGR amount becomes too large due to overshooting on the other hand, which makes it impossible to cope with the difference in the environmental condition or cope with the circumstance of the transient operation, and therefore there arises the problem that a sufficient effect cannot be obtained. As the solution to these problems, for example, Japanese Patent Laid-open No. 9-53519 discloses an exhaust gas recirculation control apparatus of an internal combustion engine.

According to the above-described Japanese Patent Laid-open No. 9-53519, the operational state of the engine is detected to set the target EGR rate, then, an intake air flow rate is detected, and the target EGR amount taken in a cylinder is set based on the target EGR rate. The valve opening degree of the EGR control valve is controlled based on the target EGR amount. As a result, even if the environment changes and an amount of intake fresh air changes, the control to attain the optimal EGR rate can be performed. Predetermined advance processing is performed for the set target EGR amount to set a command EGR amount, and the EGR control valve opening degree is controlled based on this, whereby the influence of delay in response is also reduced at a transient operation, and a control to attain a favorable EGR rate can be performed.

However, according to the above-described method, the intake air amount is detected, and the EGR valve opening degree is controlled based on this. Consequently, a delay occurs at the time of rapid acceleration and to a rapid load variation, and there is the fear that a favorable EGR control is not performed.

SUMMARY OF THE INVENTION

The present invention is made in view of the above-described problems, and has its object to provide a control method of an EGR system of an engine, which is capable of coping with an environmental change and effectively performing an EGR control at a time of rapid acceleration.

In order to attain the above-described object, a first aspect of a control method of an EGR system of an engine according to the present invention is a control method of an EGR system for recirculating part of an exhaust gas into an air supply circuit via an EGR valve provided at an EGR passage for connecting the air supply circuit and an exhaust circuit of an engine, and includes the steps of (a) obtaining, at each predetermined time interval, a flow rate of air, which is taken into the engine in an operational state at the time; (b) detecting an engine speed, a fuel flow rate, and a difference in pressure in front of and behind the EGR valve, in the operational state; (c) obtaining a target EGR valve opening degree in the operational state from relationship of the target EGR valve opening degree, which is previously set, corresponding to the detected engine speed and the detected fuel flow rate; (d) obtaining a virtual EGR gas flow rate from the detected pressure difference and the target EGR valve opening degree in the operational state; (e) obtaining a virtual EGR rate from the obtained air flow rate, the detected fuel flow rate, and the virtual EGR gas flow rate; (f) obtaining a target EGR rate in the operational state from relationship of the target EGR rate, which is previously set, corresponding to the detected engine speed and the detected fuel flow rate; (g) obtaining an EGR valve opening degree correction coefficient in the operational state from relationship of the EGR valve opening degree correction coefficient, which is previously set, corresponding to a difference or a ratio of the virtual EGR rate and the target EGR rate; (h) obtaining a command EGR valve opening degree to be used for an actual control from the EGR valve opening degree correction coefficient in the operational state, and the target EGR valve opening degree in the operational state; and (i) operating an actuator for driving the EGR valve to attain the command EGR valve opening degree.

According to the above method, the intake air flow rate in the predetermined operational state is detected, the virtual EGR rate is arithmetically operated, the difference from or the ratio to the target EGR rate is obtained, the EGR valve opening degree correction coefficient is obtained from the difference or the ratio to obtain the command EGR valve opening degree, whereby the EGR valve is driven. Accordingly, the target amount of the EGR gas can be supplied in accordance with the environmental condition, thus making it possible to reduce smoke and obtain sufficient NOx reduction effect. At the time of starting rapid acceleration, smoke can be reduced by opening the EGR valve at a proper time, and supplying the necessary EGR gas, and the EGR valve opening degree is corrected to make it possible to prevent overshooting and set the EGR rate within the target range, thus making an effective EGR control possible.

A second aspect of the control method of the EGR system of the engine according to the present invention is a control method of an EGR system which has an EGR valve provided at an EGR passage for connecting an air supply circuit and an exhaust circuit of an engine, a bypass circuit for connecting the air supply circuit and the exhaust circuit to equalize air supply pressure and exhaust pressure, and a bypass valve provided at the bypass circuit, and recirculates part of an exhaust gas into the air supply circuit via the EGR valve, and includes the steps of: (a) obtaining, at each predetermined time interval, a flow rate of air, which is taken into the engine in an operational state at the time; (b) detecting an engine speed, a fuel flow rate, and a difference in pressure in front of and behind the EGR valve, in the operational state; (c) obtaining a target EGR valve opening degree in the operational state from relationship of the target EGR valve opening degree, which is previously set, corresponding to the detected engine speed and the detected fuel flow rate; (d) obtaining a virtual EGR gas flow rate from the detected pressure difference and the target EGR valve opening degree in the operational state; (e) obtaining a virtual EGR rate from the obtained air flow rate, the detected fuel flow rate, and the virtual EGR gas flow rate; (f) obtaining a target EGR rate in the operational state from relationship of the target EGR rate, which is previously set, corresponding to the detected engine speed and the detected fuel flow rate; (g) obtaining a bypass valve opening degree correction coefficient in the operational state from relationship of the bypass valve opening degree correction coefficient, which is previously set, corresponding to a difference or a ratio of the virtual EGR rate and the target EGR rate; (h) obtaining a target bypass valve opening degree in the operational state from relationship of the target bypass valve opening degree, which is previously set, corresponding to the detected engine speed and the detected fuel flow rate; (i) obtaining a command bypass valve opening degree to be used for an actual control from the bypass valve opening degree correction coefficient in the operational state, and the target bypass valve opening degree in the operational state; and (j) operating an actuator for driving the bypass valve to attain the command bypass valve opening degree.

According to the above method, in addition to the air supply circuit, the exhaust circuit, the EGR passage and the EGR valve of the above-described first method, the bypass circuit for connecting the air supply circuit and the exhaust circuit, and the bypass valve provided at the bypass circuit are further included. After the same steps (a) to (f) as the first method, the difference or the ratio of the virtual EGR rate and the target EGR rate are obtained, and the bypass valve opening degree correction coefficient is obtained from the difference or the ratio to obtain the command bypass valve opening degree to thereby drive the bypass valve. As a result, the bypass valve can be opened by a necessary amount at a necessary time, and the pressure can be equalized when the pressure of the air supply circuit is higher than the pressure of the exhaust circuit, thus making it possible to supply a predetermined amount of EGR gas and making a favorable EGR control possible.

BRIEF DESCRIPTION OF THE DRAWINGS

FIG. 3 is a map of a target EGR valve opening degree, FIG. 4 is a map of a target EGR rate, FIG. 5 is a map of an EGR valve opening degree correction coefficient;

FIG. 6 is a map of a bypass valve opening degree correction coefficient, and

FIG. 7 is a map of a target bypass valve opening degree;

BEST MODE FOR CARRYING OUT THE INVENTION

An embodiment of a control method of an EGR system of an engine according to the present invention will be described in detail below with reference to the drawings.

Figure 1:
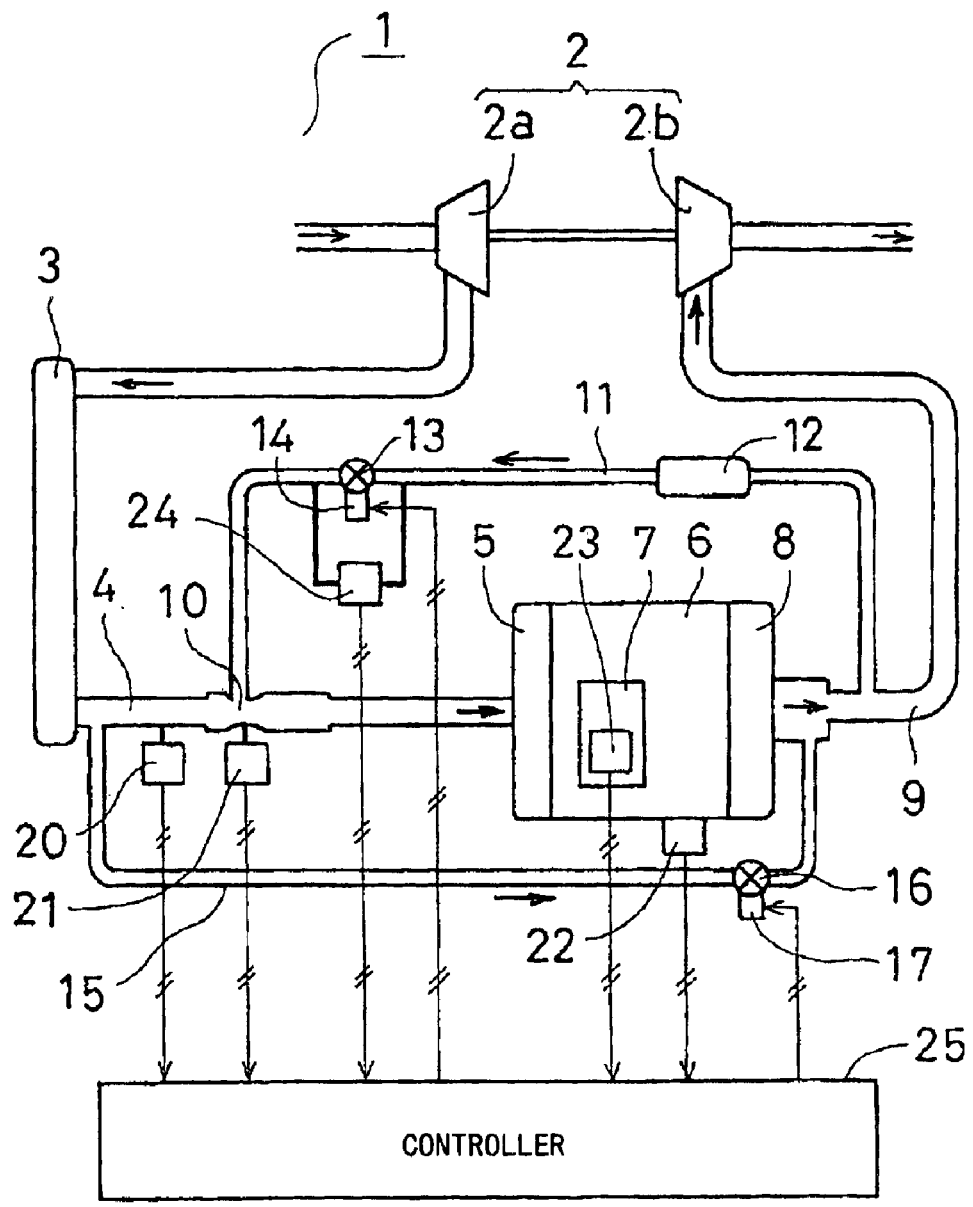
FIG. 1 is a block diagram of an EGR control system of an engine according to an embodiment of the present invention.

FIG. 1 is a block diagram showing an example of an EGR control system of an engine 1 with a supercharger. In FIG. 1, a compressor 2a of a supercharger 2 takes in air, and sends the air by pressure to an intake manifold 5 via an after-cooler 3 through an air supply pipe 4. The air sent by pressure is burned with a fuel injected by a fuel injection pump 7 inside an engine main body 6. An exhaust gas is sent to a turbine 2b of the supercharger 2 from an exhaust manifold 8 via an exhaust pipe 9, and after it drives the turbine 2b, it is released to an outside. The air supply pipe 4 is provided with a venturi 10, and a throat portion of the venturi 10 and the exhaust pipe 9 are connected by an EGR passage 11. The EGR passage 11 is provided with a cooler 12 and an EGR valve 13 for adjusting an opening area of the EGR passage 11. The EGR valve 13 is driven by an EGR valve actuator 14.

An upstream portion of the venturi 10 and the exhaust pipe 8 are connected by a bypass circuit 15, and the bypass circuit 15 is provided with a bypass valve 16 for adjusting an opening area of the circuit. The bypass valve 16 is driven by a bypass valve actuator 17. An after-cooler outlet pressure sensor 20 is provided at an outlet portion of the after-cooler 3, the venture 10 is provided with a throat pressure sensor 21, and the engine main body 6 is provided with an engine speed sensor 22. The fuel injection pump 7 is provided with a fuel flow rate sensor 23, and the EGR passage 11 is provided with an EGR valve pressure difference sensor 24 for detecting a difference in pressure in front of and behind the EGR valve 13. A controller 25 is connected to the after-cooler outlet pressure sensor 20, the throat pressure sensor 21, the engine speed sensor 22, the fuel flow rate sensor 23 and the EGR valve pressure difference sensor 24, and inputs detection values therein and performs a predetermined arithmetic operation. The controller 25 is connected to the EGR actuator 14 and the bypass valve actuator 17, and outputs control signals.

Figure 2:
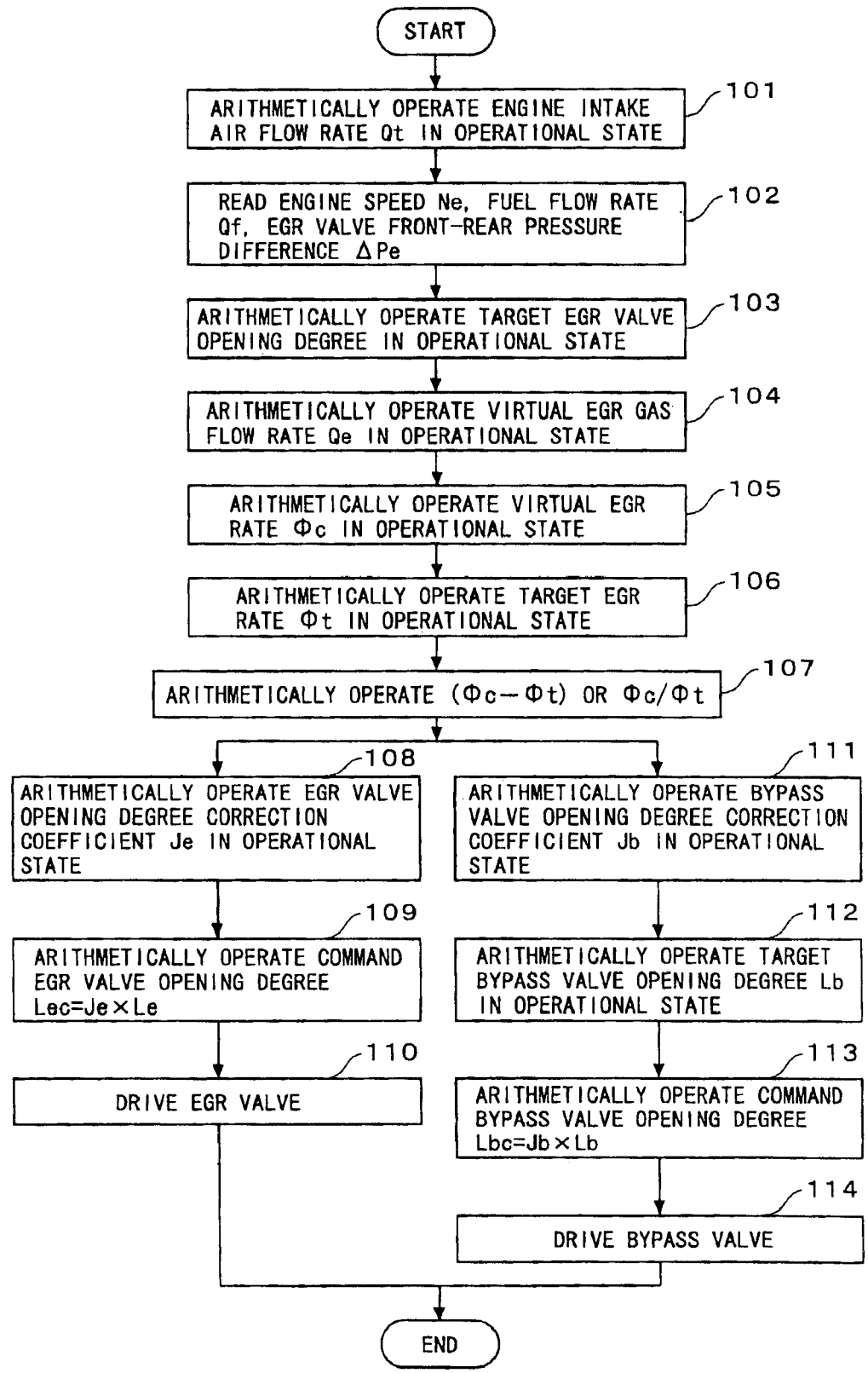
FIG. 2 is a flow chart of a control method of the EGR system according to the embodiment.

A control method of the EGR system will be described in detail below. FIG. 2 is a flow chart showing an example of a control method corresponding to an environmental change, a load variation and the like at a time of a normal operation. This control performs an arithmetic operation at each predetermined time interval (for example, 0.01 seconds) continuously during an engine operation, and controls opening degrees of the EGR valve 13 and the bypass valve 16. In FIG. 1 and FIG. 2, after starting the operation, the controller 25 obtains, at each predetermined time interval, an air flow rate Qt taken into the engine 1 with the supercharger in the operational state at the time in step 101. In step 102, the controller 25 inputs detection values of an engine speed Ne, a fuel flow rate Qf, a EGR valve front and rear pressure difference $\Delta Pe$ therein from the engine speed sensor 22, the fuel flow rate sensor 23 and the EGR valve pressure difference sensor 24 in this operational state.

Figure 3:
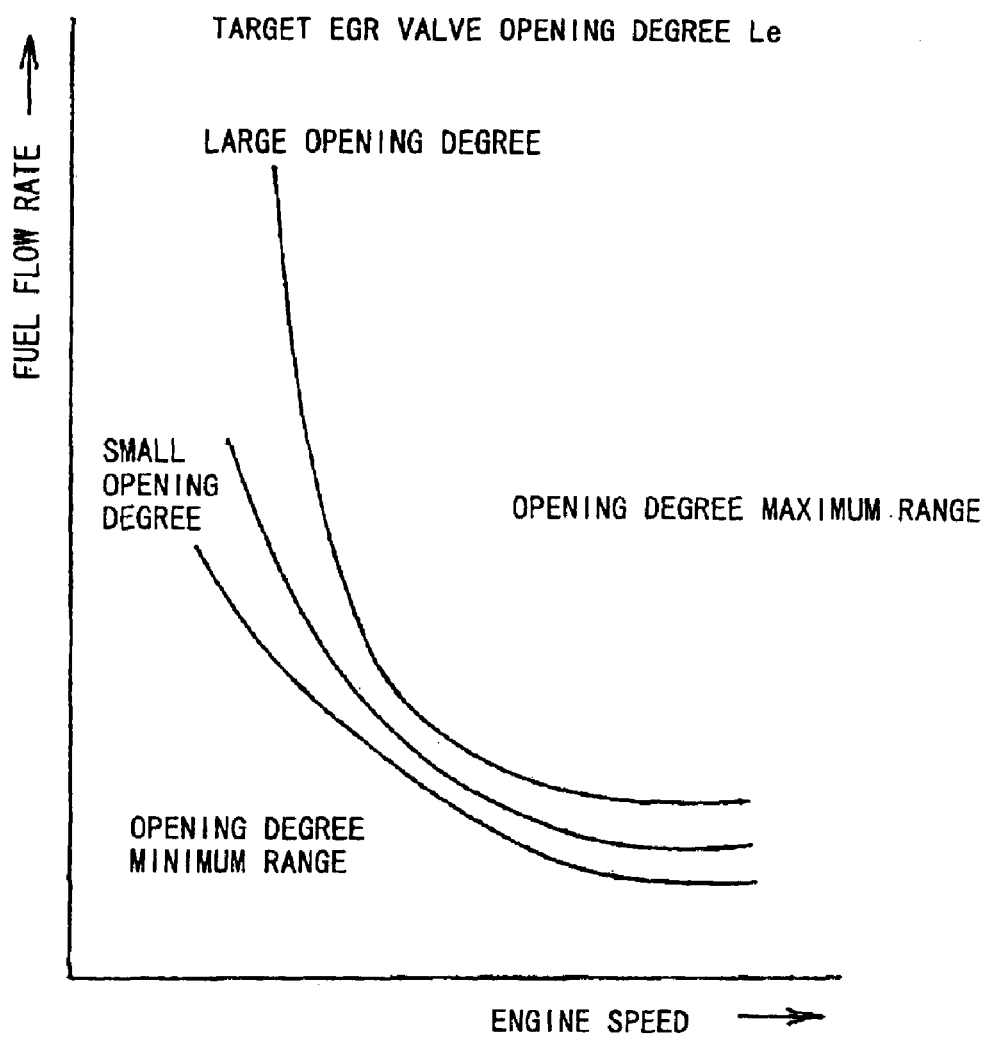
FIG. 3 to FIG. 7 show maps used in arithmetic operations in a control flow in FIG. 2.

In step 103, the controller 25 arithmetically operates a target EGR valve opening degree Le in the operational state from a map showing relationship of the target EGR valve opening degree Le which is previously set corresponding to the engine speed Ne and the fuel flow rate Qf, as shown in FIG. 3. The valve opening degree may be, for example, a valve lift amount. In step 104, the controller 25 arithmetically operates a virtual EGR gas flow rate Qe in the operational state from the EGR valve front and rear pressure difference ΔPe inputted therein in step 102 and the target EGR valve opening degree Le. In step 105, the controller 25 arithmetically operates a virtual EGR rate Φc in the operational state with use of equation (1) from the air flow rate Qt obtained in step 101, the virtual EGR gas flow rate Qe obtained in step 104 and the fuel flow rate Qf obtained in step 102.

$$\Phi c = Qe/(Qt+Qf) \quad (1)$$

Figure 4:
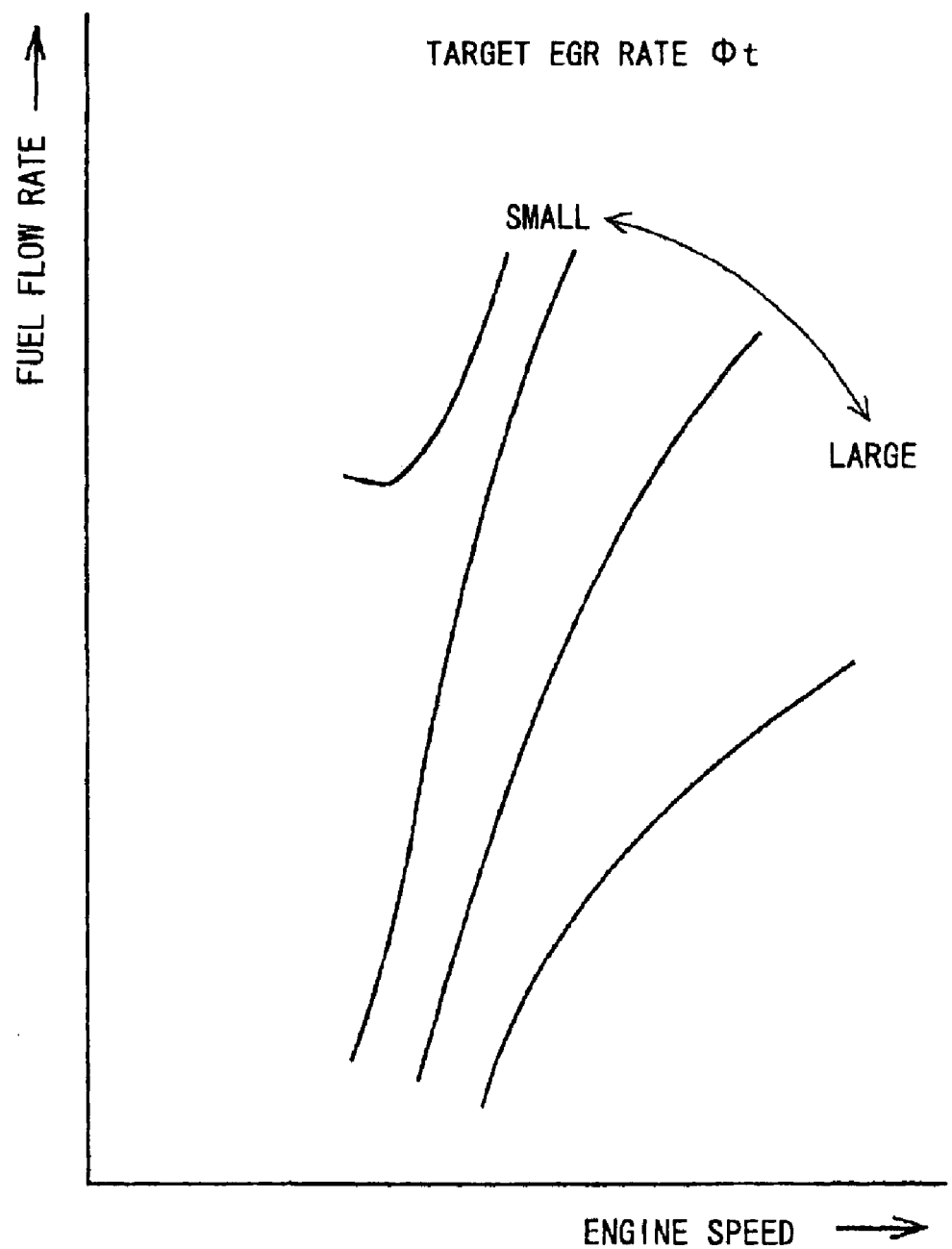
Figure 5:
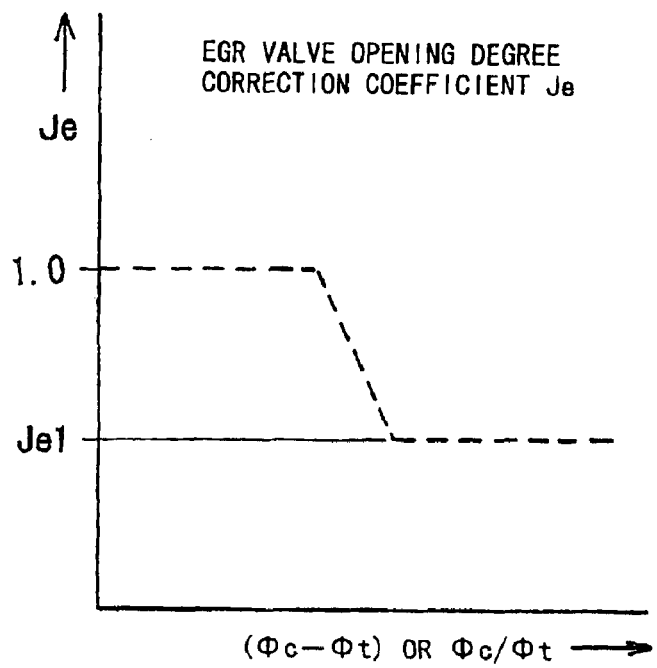

In step 106, the controller 25 arithmetically operates a target EGR rate Φt in the operational state from a map showing relationship of the target EGR rate Φt which is previously set corresponding to the engine speed Ne and the fuel flow rate Qf, as shown in FIG. 4. In step 107, the controller 25 arithmetically operates a difference (Φc−Φt) or a ratio (Φc/Φt) of the virtual EGR rate Φc and the target EGR rate Φt. In step 108, the controller 25 arithmetically operates an EGR valve opening degree correction coefficient Je in the operational state based on the value of (Φc−Φt) or (Φc/Φt) obtained in step 107 from a map showing relationship between the (Φc−Φt) or (Φc/Φt), and the EGR valve opening degree correction coefficient Je, which is previously obtained, as shown in FIG. 5. In FIG. 5, when the value of (Φc−Φt) or (Φc/Φt) is smaller than a predetermined value, the value of Je is 1.0, and when the value of (Φc−Φt) or (Φc/Φt) is the predetermined value or more, the value of Je becomes a value Je1 (for example, 0.5) which is not more than 1.0. Namely, at a time of a steady operation in which the virtual EGR rate Φc and the target EGR rate Φt substantially correspond to each other, the value of Je is 1.0. In step 109, the controller 25 arithmetically operates a command EGR valve opening degree Lec in the operational state based on equation (2) from the target EGR valve opening degree Le obtained in step 103, and the EGR valve opening degree correction coefficient Je obtained in step 108.

$$Lec = Je \times Le \quad (2)$$

In step 110, the controller 25 outputs a control signal to the EGR valve actuator 14 based on the command EGR valve opening degree Lec obtained in step 109 to drive it, and makes the opening degree of the EGR valve 13 a predetermined opening degree.

Next, the control method of the bypass valve 16 will be explained. As described above, when air supply pressure is higher than exhaust pressure, an EGR gas cannot be supplied to an air supply side favorably in some cases. Consequently, in order to equalize the supply pressure and the exhaust pressure, the bypass circuit 15 for connecting the air supply circuit and the exhaust circuit is provided, and the bypass valve 16 for opening and closing the bypass circuit 15 is provided. However, if the bypass valve 16 is opened when the exhaust pressure is higher than the supply pressure, the exhaust gas flows into the supply air and there arises the fear of reducing the engine performance. For this reason, when the exhaust pressure is higher than the supply pressure, the controller 25 outputs a command signal to the bypass valve actuator 17 to close the bypass valve 16. Accordingly, the control of the bypass valve 16 is performed only when the supply pressure is higher than the exhaust pressure.

Figure 6:
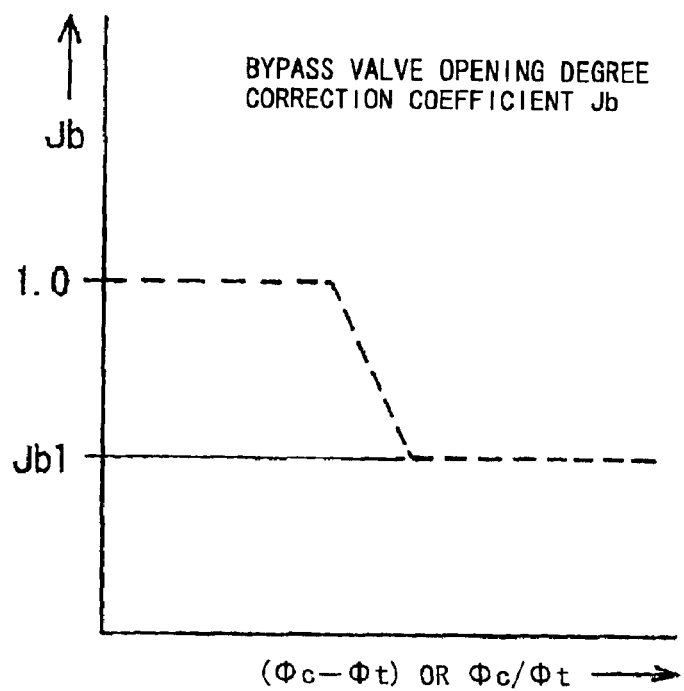
Figure 7:
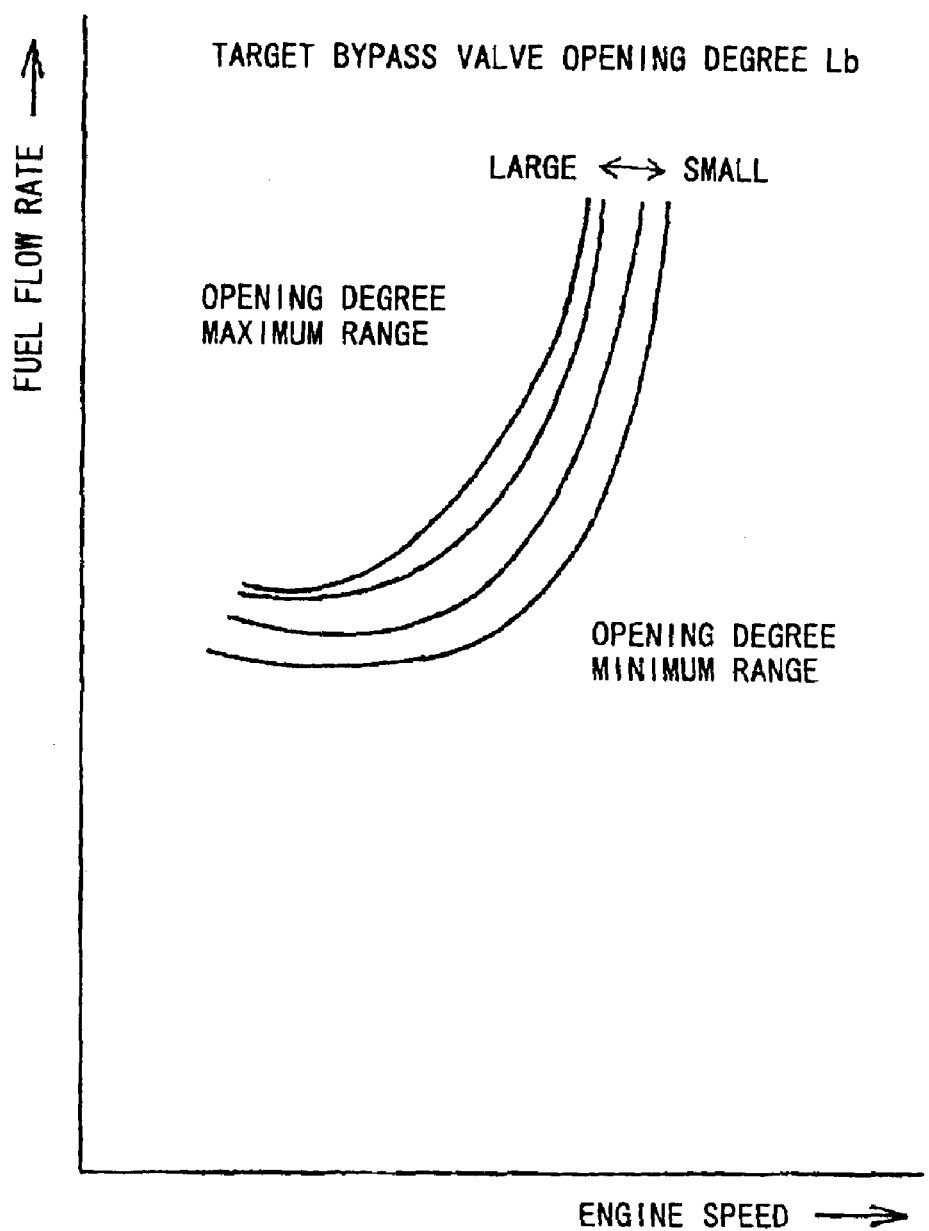

In FIG. 2, after arithmetically operating (Φc−Φt) or (Φc/Φt) in step 107, the controller 25 arithmetically operates a bypass valve opening degree correction coefficient Jb in the operational state based on the value of (Φc−Φt) or (Φc/Φt) obtained in step 107 from a map showing relationship between (Φc−Φt) or (Φc/Φt), and the bypass valve opening degree correction coefficient Jb, which is previously set, as shown in FIG. 6, in step 111. In FIG. 6, when the value of (Φc−Φt) or (Φc/Φt) is smaller than a predetermined value, the value of Jb is 1.0, and when the value of (Φc−Φt) or (Φc/Φt) is the predetermined value or more, the value of Jb becomes a value Jb1 (for example, 0.5) which is not more than 1.0. Namely, at a time of steady operation in which the virtual EGR rate Φc and the target EGR rate (Φt) substantially correspond to each other, the value of Jb is 1.0. In step 112, the controller 25 arithmetically operates a target bypass valve opening degree Lb in the operational state from a map showing relationship of the target bypass valve opening degree Lb, which is previously set corresponding to the engine speed Ne and the fuel flow rate Qf, as shown in FIG. 7. In step 113, the controller 25 arithmetically operates a command bypass valve opening degree Lbc in the operational state based on equation (3) from the target bypass valve opening degree Lb obtained in step 103, and the bypass valve opening degree correction coefficient Jb obtained in step 111.

$$Lbc = Jb \times Lb \quad (3)$$

In step 114, the controller 25 outputs a control signal to the bypass valve actuator 17 based on the command bypass valve opening degree Lbc obtained in step 113 to drive it, and makes the opening degree of the bypass valve 16 a predetermined opening degree.

Figure 8:
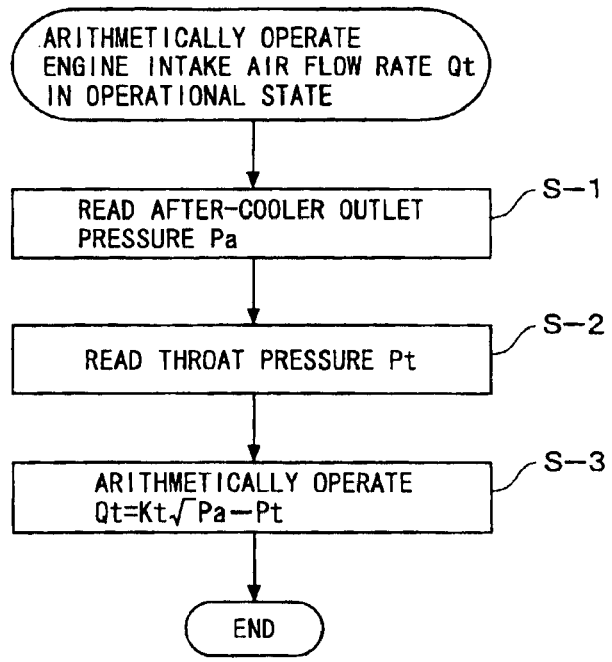
FIG. 8 is a flow chart of an engine intake air flow rate arithmetic operation of step 101 in FIG. 2.

Detail of the arithmetic operations of step 101 and step 104 will be explained. FIG. 8 is an arithmetic operation flow for obtaining the air flow rate Qt taken into the engine in the operational state in step 101 in the control flow in FIG. 2. In FIG. 8, in step S-1, the controller 25 inputs a detection value of an after-cooler outlet pressure Pa therein from the after-cooler outlet pressure sensor 20. In step S-2, the controller 25 inputs a detection value of a throat pressure Pt therein from the throat pressure sensor 21. In step S-3, the controller 25 obtains the air flow rate Qt based on equation (4).

$$Qt = Kt(Pa-Pt)^{1/2} \quad (4)$$

Here, Kt is a throat flow rate coefficient.

Figure 9:
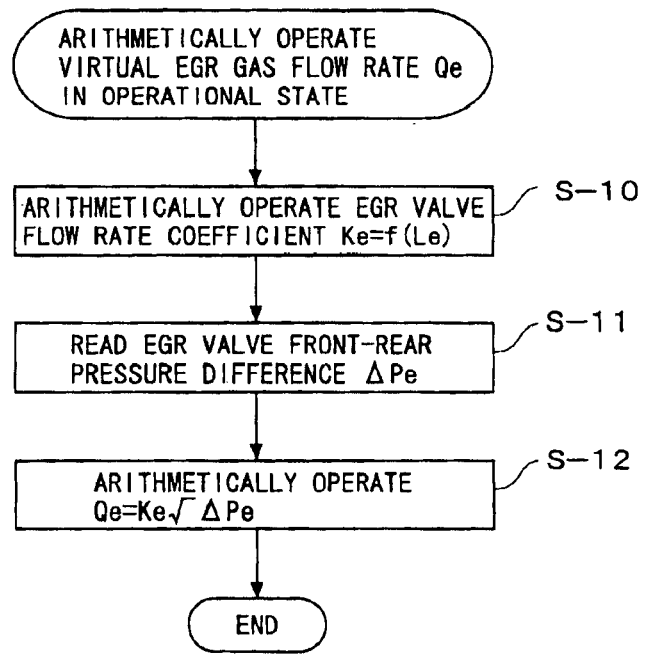
FIG. 9 is a flow chart of a virtual EGR gas flow rate arithmetic operation of step 104 in FIG. 2.

FIG. 9 is an arithmetic operation flow for obtaining the virtual EGR gas flow rate Qe in the operational state in step 104 in FIG. 2. In FIG. 9, in step S-10, the controller 25 arithmetically operates an EGR valve flow rate coefficient Ke based on equation (5) with use of the target EGR valve opening degree Le obtained in step 103 in FIG. 2.

$$Ke = f(Le) \quad (5)$$

In step S-11, the controller 25 inputs a detection value of the front-rear pressure difference ΔPe of the EGR valve 13 therein from the EGR valve pressure difference sensor 24. In step S-12, the controller 25 arithmetically operates the virtual EGR gas flow rate Qe based on equation (6).

$$Qe = Ke(\Delta Pe)^{1/2} \quad (6)$$

Figure 10:
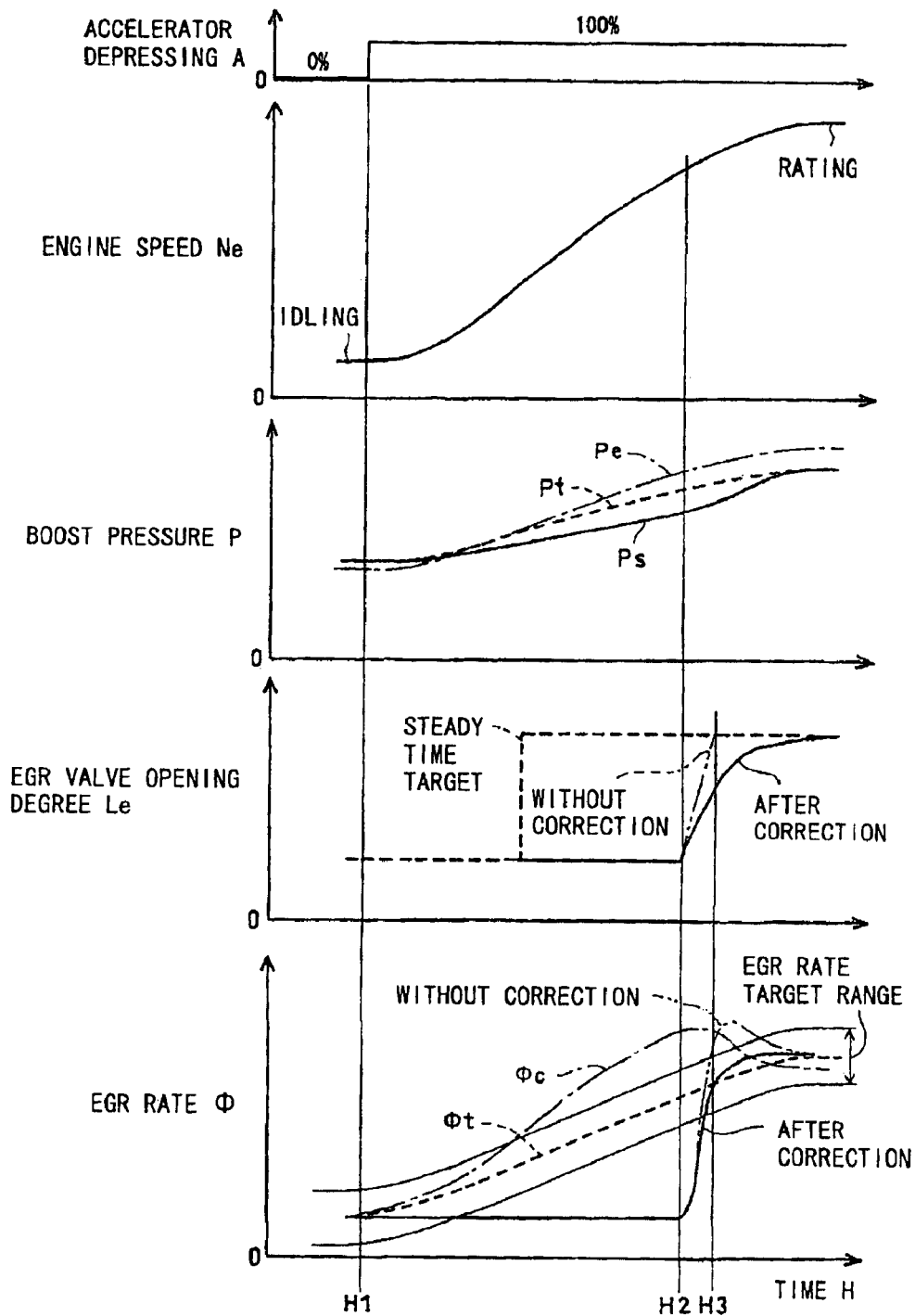
FIG. 10 is a graph showing relationship between time, and an acceleration pedal depressing amount, an engine speed, boost pressure, an EGR valve opening degree and an EGR rate at a time of rapid acceleration of the engine according to the embodiment.

Next, a control of the EGR system at a time of rapid acceleration of the engine will be explained. FIG. 10 is a graph showing relationship of changes of a depressing amount A onto an accelerator pedal, the engine speed Ne, the exhaust manifold gas pressure Pe, a boost pressure Pt at the steady time, a boost pressure Ps at the accelerating time, the EGR valve opening degree Le and the EGR rate Φ, with respect to a time H, for example, when the engine is rapidly accelerated after the engine is started, and the EGR valve is opened at a predetermined point of time. The horizontal axis represents the time H, and the vertical axis represents the depressing amount A onto the accelerator pedal, the engine speed Ne, the gas pressure P, the EGR valve opening degree Le and the EGR rate Φ, from the top.

In FIG. 10, after the engine is started, the accelerator pedal is depressed from 0% to 100% at a time H1. The engine speed Ne changes from an idling engine speed at the time H1 to a rated engine speed. The boost pressure Ps at the time of acceleration becomes lower than the boost pressure Pt at the steady time during acceleration due to a delay in air flow, and the difference from the exhaust manifold gas pressure Pe becomes large. When the engine speed Ne reaches the vicinity of the rated engine speed, the Pt and the Ps become equal. Accordingly, the virtual EGR rate Φc becomes larger than the steady time target EGR rate Φt during acceleration, and as the engine speed Ne is closer to the rated engine speed, the difference thereof becomes smaller. Since the fuel flow rate Qf is higher as compared with the engine intake air flow rate Qt immediately after the start, and the excess air ratio is low, the controller 25 outputs a command signal to start to open the EGR valve 13 at a predetermined time H2.

The opening degree of the EGR valve 13 hereinafter is controlled according to the process steps of the flow chart shown in FIG. 2. Namely, the controller 25 outputs the control signal to the EGR valve actuator 14 based on the command EGR valve opening degree Lec in the operational state obtained in step 109 to drive it, and makes the opening degree of the EGR valve 13 a predetermined opening degree. As a result, the EGR valve opening degree Le is in a shape after correction, which is shown by the solid line, and the EGR rate Φ is in a shape after correction, which is shown by the solid line. When the EGR valve opening degree Le is opened as that without correction shown by the two-dot chain line, the EGR rate Φ overshoots as that without correction shown by the two-dot chain line, and excessive EGR gas is supplied exceeding a predetermined EGR rate target range. However, according to this control method, the EGR rate Φ can be contained within the EGR rate target range without overshooting in a short time.

When rapid acceleration is made with low output power of engine in a state with the small EGR valve opening degree, or output power is abruptly increased because a large load variation occurs, the same control as in the case of the above-described rapid acceleration after the start is carried out. In the above-described embodiment, the engine inflow air flow rate Qt is obtained by the arithmetic operation from the after-cooler outlet pressure Pa and the throat pressure Pt, but it may be directly measured by an air flow meter or the like.

The control method of the EGR system of the engine of the present invention detects the pressure difference ΔPe in front of and behind the EGR valve and obtains the virtual EGR rate to control the EGR valve and the bypass valve. Since the ΔPe occurs even if the EGR gas does not flow, it becomes possible to control the EGR valve and the bypass valve at an early stage, and the actual EGR rate is controlled to be the target value without delay. Accordingly, smoke of the exhaust gas is reduced corresponding to the environmental change, a load variation, and the like at the time of the normal operation, and sufficient NOx reduction effect can be obtained. Since the EGR valve starts to be opened at a predetermined time at the time of rapid acceleration, and the EGR valve can be opened by making suitable correction within a short time, thus making it possible to obtain the NOx reduction effect without increasing smoke and PM.

What is claimed is:

1. A control method of an EGR system for recirculating part of an exhaust gas into an air supply circuit via an EGR valve provided at an EGR passage for connecting said air supply circuit and an exhaust circuit of an engine, comprising the steps of:
   (a) obtaining, at each predetermined time interval, a flow rate of air, which is taken into the engine in an operational state at the time;
   (b) detecting an engine speed, a fuel flow rate, and a difference in pressure in front of and behind the EGR valve, in said operational state;
   (c) obtaining a target EGR valve opening degree in said operational state from relationship of the target EGR valve opening degree, which is previously set, corresponding to the detected engine speed and the detected fuel flow rate;
   (d) obtaining a virtual EGR gas flow rate from the detected pressure difference and the target EGR valve opening degree in said operational state;
   (e) obtaining a virtual EGR rate from the obtained air flow rate, the detected fuel flow rate, and the virtual EGR gas flow rate;
   (f) obtaining a target EGR rate in said operational state from relationship of the target EGR rate, which is previously set, corresponding to the detected engine speed and the detected fuel flow rate;
   (g) obtaining an EGR valve opening degree correction coefficient in said operational state from relationship of the EGR valve opening degree correction coefficient, which is previously set, corresponding to a difference or a ratio of the virtual EGR rate and the target EGR rate;
   (h) obtaining a command EGR valve opening degree to be used for an actual control from the EGR valve opening degree correction coefficient in said operational state, and the target EGR valve opening degree in said operational state; and
   (i) operating an actuator for driving said EGR valve to attain the command EGR valve opening degree.

2. A control method of an EGR system which has an EGR valve provided at an EGR passage for connecting an air supply circuit and an exhaust circuit of an engine, a bypass circuit for connecting said air supply circuit and said exhaust circuit to equalize air supply pressure and exhaust pressure, and a bypass valve provided at said bypass circuit, and recirculates part of an exhaust gas into said air supply circuit via said EGR valve, comprising the steps of:
   (a) obtaining, at each predetermined time interval, a flow rate of air, which is taken into the engine in an operational state at the time;
   (b) detecting an engine speed, a fuel flow rate, and a difference in pressure in front of and behind the EGR valve, in said operational state;
   (c) obtaining a target EGR valve opening degree in said operational state from relationship of the target EGR valve opening degree, which is previously set, corresponding to the detected engine speed and the detected fuel flow rate;
   (d) obtaining a virtual EGR gas flow rate from the detected pressure difference and the target EGR valve opening degree in said operational state;
   (e) obtaining a virtual EGR rate from the obtained air flow rate, the detected fuel flow rate, and the virtual EGR gas flow rate;

(f) obtaining a target EGR rate in said operational state from relationship of the target EGR rate, which is previously set, corresponding to the detected engine speed and the detected fuel flow rate;

(g) obtaining a bypass valve opening degree correction coefficient in said operational state from relationship of the bypass valve opening degree correction coefficient, which is previously set, corresponding to a difference or a ratio of the virtual EGR rate and the target EGR rate;

(h) obtaining a target bypass valve opening degree in said operational state from relationship of the target bypass valve opening degree, which is previously set, corresponding to the detected engine speed and the detected fuel flow rate;

(i) obtaining a command bypass valve opening degree to be used for an actual control from the bypass valve opening degree correction coefficient in said operational state, and the target bypass valve opening degree in said operational state; and (j) operating an actuator for driving said bypass valve to attain the command bypass valve opening degree.

* * * * *